Figure 1:
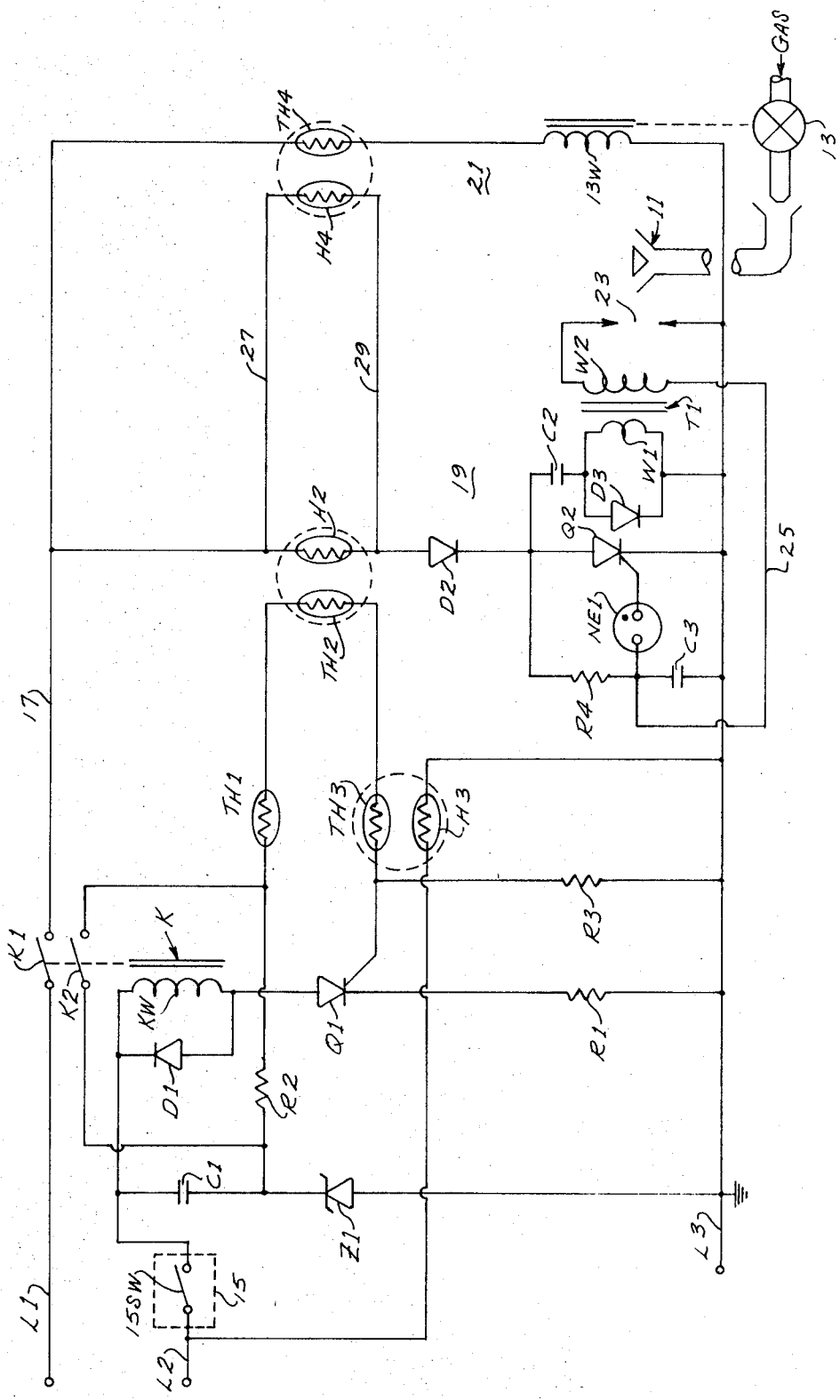

United States Patent

[11] 3,600,118

[72] Inventor Hans G. Hirsbrunner
 Attleboro, Mass.
[21] Appl. No. 844,110
[22] Filed July 23, 1969
[45] Patented Aug. 17, 1971
[73] Assignee Texas Instruments Incorporated
 Dallas, Tex.

[54] FURNACE CONTROL APPARATUS
 10 Claims, 3 Drawing Figs.
[52] U.S. Cl. .................................................. 431/66,
 219/511, 236/68 B, 317/132, 338/23
[51] Int. Cl. ................................................ G05d 23/24
[50] Field of Search .................................... 236/15, 68;
 307/310; 219/505, 511; 431/66 X, 71; 317/132;
 338/22, 23; 328/3

[56] References Cited
 UNITED STATES PATENTS

| | | | |
|---|---|---|---|
| 3,532,451 | 10/1970 | Willson .................. | 431/66 |
| 3,199,087 | 8/1965 | Foglia ..................... | 307/310 X |
| 3,277,946 | 10/1966 | Forbes .................... | 307/310 X |
| 3,343,004 | 9/1967 | Ovshinsky ............... | 307/310 |
| 3,351,818 | 11/1967 | Zielinski ................. | 307/117 X |
| 3,399,948 | 9/1968 | Myers et al. ............ | 431/71 X |

*Primary Examiner*—William E. Wayner
*Attorneys*—Harold Levine, Edward J. Connors, Jr., John A. Haug, James P. McAndrew and Gerald B. Epstein

ABSTRACT: In furnace control apparatus, circuitry for energizing an electrically energizable fuel valve of the furnace. A thermistor is connected for bistable operation in either an unheated first state or a self-heating second state, the thermistor being shifted from the first to the second state when momentarily heated above a predetermined threshold temperature. In the second state, the thermistor causes energization of the fuel valve for supplying fuel to the furnace burner. A heater for the thermistor is energized by a fuel demand signal and momentarily heats the thermistor above its threshold temperature, thereby causing fuel to be supplied to the burner in response to a demand for fuel.

This invention relates to apparatus for controlling operation of a furnace, and more particularly to such furnace control apparatus including improved circuitry for energizing an electrically energizable fuel valve of the furnace.

FURNACE CONTROL APPARATUS

This invention is an improvement of the electrothermal furnace control disclosed in copending application Ser. No. 822,901, filed May 8, 1969. Various improvements of the latter electrothermal control are the subject of applications Ser. No. 822,902, filed May 8, 1969, Ser. No. 836,068, filed June 24, 1969, and Ser. No. 837,823, filed June 30, 1969. These latter disclosures relate to furnace controls utilizing solid state devices and electrothermal logic permitting simplified furnace control circuitry, as compared with the furnace control described in the aforesaid application Ser. No. 822,901, without comprising safety or reliability. In each of the furnace controls described in the aforesaid disclosures, semiconductor current-switching devices are employed for energizing the furnace fuel valve, this valve being of the electrical energizable type which, when energized, supplies fuel to the furnace burner. In these controls, a fuel demand signal, e.g., a voltage delivered by an ignition circuit, causes triggering of the current-switching device. In general, electrothermal devices, e.g., thermistors, are simpler in operation and less expensive than such switching devices and accordingly their use is desirable not only for the various timing or protective functions required in a furnace control of this type, but for energizing the fuel valve as well. Further, such triggerable semi-conductor-switching devices are prone to being triggered by voltage transients, which for example, sometimes occur in residential electrical systems. There is thus the possibility that, where such switching devices are connected for energization of the fuel valve, such transient triggering could permit fuel to be accidentally delivered to the furnace burner, causing dangerous accumulation of unburned fuel.

Accordingly, among the several objects of the present invention may be noted the provision of furnace control apparatus including thermistors for energizing an electrically energizable fuel valve of the furnace; the provision of such apparatus for energizing the furnace fuel valve having improved simplicity without compromise in safety or reliability; the provision of such apparatus which substantially prevents accidental energization of the furnace fuel valve by voltage transients; the provision of such apparatus which is easily and economically manufactured. Other objects and features will be in part apparent and in part pointed out hereinafter.

Briefly, apparatus of the present invention is useful in furnace control apparatus of the type used for controlling the operation of a furnace including a burner and an electrically energizable fuel valve which, when sufficiently energized, supplies fuel to the burner. The furnace control apparatus includes means for producing a signal which, in effect, is indicative of a demand for fuel. Apparatus of this invention is adapted to cause energization of the fuel valve in response to this demand for fuel and includes a thermistor having an equilibrium current/voltage characteristic having a negative resistance region interconnected with a circuit including a resistance so that the thermistor operates in either of two stable states. In the first state, the thermistor is unheated and in the second state it is self-heating. The thermistor is adapted to shift operation from its first to its second state when momentarily heated above a predetermined threshold temperature. In the second state, the thermistor causes energization of the fuel valve for applying fuel to the burner. Means is energized by the fuel demand signal to cause momentary heating of the thermistor above its threshold temperature so that the fuel valve is energized and thus supplies fuel to the burner in response to this demand for fuel.

Figures 2, 3:
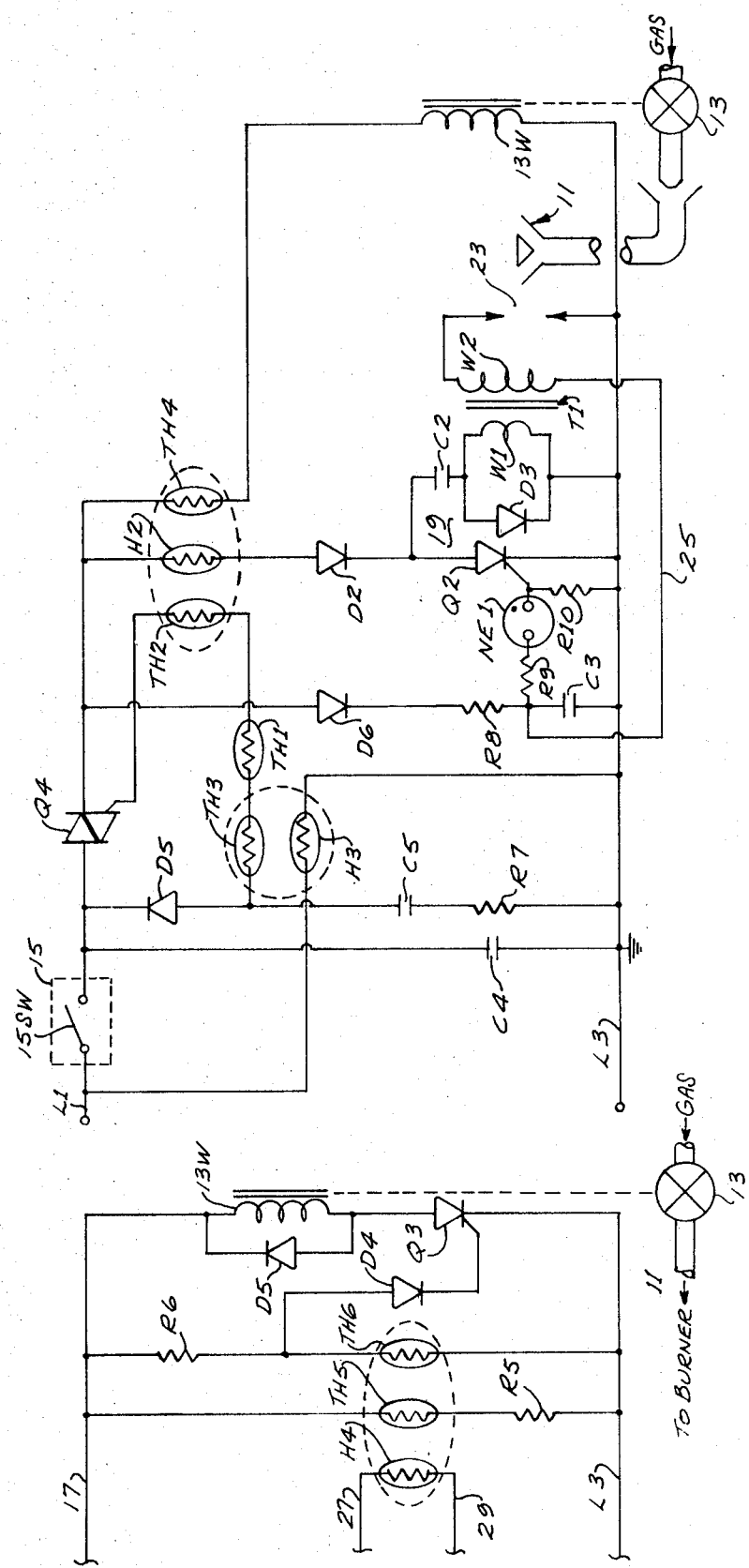

In the accompanying drawings, in which are illustrated three of various possible embodiments of the invention, FIG. 1 is a circuit schematic diagram of a first embodiment of furnace control apparatus according to the present invention wherein a thermistor is series connected with the fuel valve of a furnace to cause energization thereof;

FIG. 2 is a circuit schematic diagram showing an alternative embodiment wherein a thermistor controls the triggering of a semiconductor current-switching device interconnected with the fuel valve; and FIG. 3 is a circuit schematic diagram of another embodiment of this invention utilizing a thermistor arrangement achieving further simplication of the general type of control shown in FIG. 1.

Corresponding reference characters indicate corresponding parts throughout the several views of the drawings.

Referring now to FIG. 1 there is illustrated a first embodiment of an electrothermal furnace control utilizing fuel-valve-energizing circuitry according to the present invention. The furnace control is of the type adapted to control a furnace such as a gas-fired, forced hot air furnace of the type conventionally used for residential heating. Furnace includes a burner, illustrated generally at 11, to which gas is supplied for combustion when a solenoid operated gas valve 13 is opened by energization of its winding 13W. Combustion at burner 11 supplies heat to a plenum of the furnace. The furnace may be of the type wherein a forced air draft is supplied to the burner by means of a blower. A furnace of the present type is shown and described in the aforesaid application, Ser. No. 822,901. The furnace is controlled in response to the demand of the usual thermostat 15 suitably located for sensing the temperature in a zone heated by operation of the furnace, thermostat 15 including a switch 15SW which is closed to indicate a demand for heat. Power leads L1 and L2 are provided to supply power to the apparatus at suitable voltages, e.g., 115 v. AC line voltage and 24 v. AC respectively, with respect to a circuit ground or common lead L3.

When thermostat switch 15SW is closed, the voltage between leads L2 and L3 is supplied across the cathode and anode terminals of an SCR Q1 by means of a series circuit including the winding of a relay or magnetic contactor K, this winding being designated KW, and a resistor R1 interconnecting the cathode of SCR Q1 and lead L3. A diode D1 is connected across winding KW. Contactor K includes a pair of normally open contacts K1 and K2 which are adapted to close by energization of winding KW upon triggering of SCR Q1. When closed, contacts K2 are adapted to shunt a resistor R2 which is part of a triggering circuit for SCR Q1 including, in series, a plenum-sensing thermistor TH1, a timer sensor thermistor TH2, and an airflow sensor thermistor TH3, one side of the latter being connected to the gate or triggering terminal of SCR Q1. This triggering circuit includes a resistor R3 interconnecting the gate terminal of SCR Q1 and lead L3. A Zener diode Z1 connected between one side of capacitor C1 and lead L3 provides regulation of the voltage supplied to this triggering circuit. A thermistor H3 is coupled to thermistor TH3 to provide means for heating the latter. Thermistor H3 is connected between leads L2 and L3 for continuous energization. This pair of thermistors is suitably located in an air draft duct of the furnace or in conjunction with a draft blower thereof to be cooled by forced air draft provided to the burner, heater thermistor H3 causing heating of thermistor TH3 to prevent triggering of SCR Q1 in the event there is insufficient forced air draft. Thermistors TH1 and TH2 are also adapted to prevent or terminate triggering of SCR Q1 in the event of excessive plenum temperature or, as will appear, in the event that an ignition attempt should not be successful. Thermistors TH1—TH3 are each preferably of the type of PTC thermistor having a transition temperature above which the resistance thereof increases relatively abruptly. A more specific description of their type and interconnection in the present manner, while not necessary for the present purposes, may be found in aforesaid application Ser. No. 822,902.

Contacts K1 are adapted, when closed, to connect leads L1 via a lead 17 to an ignition circuit indicated generally at 19 and to a gas valve circuit indicated generally at 21. Ignition circuit 19 includes an SCR Q2 whose anode and cathode terminals are connected in series circuit between leads 17 and lead L3 which includes a thermistor H2 and a diode D2. Thermistors H2 and TH2 together constitute an electrothermal timer and thermistor H2 is thermally coupled to thermistor TH2 to heat the latter for this purpose. Interconnected with the cathode and anode terminals of SCR Q2 are a capacitor C2 and the primary winding W1 of a conventional spark transformer T1. Capacitor C2 is charged by the voltage across the anode and cathode terminals of SCR Q2 when the latter is not triggered and, for this purpose, a diode D3 is connected across winding W1 to reduce the charging time constant of capacitor C2. A secondary winding W2 thereof is adapted to supply voltage across a pair of electrodes 23 to cause sparking thereacross for causing an ignition of the gas at burner 11. A triggering circuit for SCR Q2 includes a neon bulb NE1 and a capacitor C3, one side of which is connected to lead L3. A resistor R4 supplies current for charging capacitor C3 to a voltage causing breakdown of neon bulb NE1 for triggering of SCR Q2. A connection 25 is made from the top of capacitor C3 from one side of the winding W2 for a purpose to be explained.

Gas valve circuit 21 comprises an NTC thermistor TH4, i.e., a thermistor having a negative thermal coefficient of resistivity, connected in series with gas valve winding 13W. Thermistor TH4 is of the type having an equilibrium current/voltage characteristic having a negative resistance region. Consequently, dependent upon the resistance in this circuit (this resistance being constituted, for example, by the resistance inherent in winding 13W), the thermistor is bistable in operation and will thus operate in one of two stable states. Such a bistable thermistor arrangement is described in greater detail in copending application Ser. No. 608,230, filed Jan. 9, 1967, entitled Electro-thermal Timing Apparatus, and assigned to the present assignee. Said application shows the aforesaid type of current/voltage characteristic. The operating point of such a thermistor can be made to shift from its first state (in which it is unheated) to its second state (in which it is self-heating) by momentarily heating the thermistor above a predetermined threshold temperature. A heater thermistor H4 is thermally coupled to thermistor TH4 to provide means for momentarily heating thermistor TH4 above this threshold temperature. Thermistor H4 is connected in parallel with thermistor H2 by means of a pair of leads 27 and 29 whereby thermistor H4 is energized by potential across leads 27 and 29, which potential can be considered to constitute a signal indicating a demand for fuel, as will be apparent from the following explanation of the operation of this control.

Operation of the FIG. 1 control is substantially as follows: Assuming that leads L1—L3 suitably connect the apparatus to AC power sources, upon the closing of thermostat switch 15SW (indicating a demand for heat), AC voltage is supplied by means of relay winding KW across the anode and cathode terminals of SCR Q1. Capacitor C1 supplies triggering current through thermistors TH1—TH3 to the gate terminal of SCR Q1, causing the latter to be triggered and thus become conductive on alternate half cycles of the applied AC waveform. This energizes relay winding KW, causing closing of contacts K1 and K2. The closing of contacts K1 supplies the line voltage across leads L1 and L3 to the ignition circuit 19 and gas valve circuit 21. A voltage is thus applied across the anode and cathode terminals of SCR Q2 and current is supplied through the parallel thermistors H2 and H4 and via diode D2 to quickly charge capacitor C2. At the same time, charging current is supplied to capacitor C3 via resistor R4. Each time the voltage across capacitor C3 reaches the breakdown, or ionization, potential of neon bulb NE1, the SCR Q2 is triggered, discharging capacitor C2 through primary winding W1 of transformer T1. This triggering of SCR Q2 occurs many times per second, causing recurrent sparking across electrodes 23. Such triggering draws current through thermistors H2 and H4, causing self-heating thereof.

In the absence of heating by thermistor H4, thermistor TH4 is in a first stable state in which it has a relatively high resistance and thus passes little current through gas valve winding 13W. Such current is insufficient to cause gas valve 13 to open. However, when thermistor TH4 is heated by thermistor H4 (as a result of self-heating from current drawn therethrough) above a predetermined threshold temperature, thermistor TH4 shifts from its stable first state to a second state in which sufficient current flows therethrough to cause energization of winding 13W for opening gas valve 13, thus supplying fuel to burner 11. The resultant higher current flowing through thermistor TH4 causes it to self-heat, which self-heating is regenerative in character, causing the thermistor to stably remain in the second state even though external heating thereof should now cease. From the foregoing it may be seen that the fuel valve is energized in response to the demand of thermostat 15 for heat.

With gas valve 13 thus energized and supplying fuel to burner 11, the recurrent sparking across electrodes 23 causes ignition of the gas and the furnace accordingly delivers heat to the heated zone wherein thermostat 15 is located. The flame at electrodes 23 resulting from combustion of the gas causes a conductive path across these electrodes. Through lead 25, this conductive path discharges capacitor C3 and causes it to remain discharged so long as combustion continues. Accordingly, when ignition occurs, triggering of SCR Q2 is terminated and thus ignition circuit 19 ceases to generate sparking. When triggering of SCR Q2 ceases, current is no longer drawn through thermistors H2 and H4 and their heating is accordingly terminated. Thus the heating of thermistor TH4 by thermistor H4 ceases. However, thermistor TH4 remains in its stable self-heating state as long as voltage is supplied thereto by lead 17. Accordingly, gas continues to be supplied to burner 11 until thermostat switch 15SW opens indicating no further demand for heat.

If ignition should not be successful, continued heating of thermistor TH2 by thermistor H2 as a result of the current drawn therethrough by continued triggering of SCR Q2 causes, after a predetermined time interval, thermistor TH2 to be heated above a predetermined threshold temperature above which it prevents further triggering of SCR Q1. This deenergizes contactor winding KW, thus opening contacts K1 and K2. The opening of contacts K1 deenergizes both ignition circuit 19 and gas valve circuit 21. Assuming that the thermostat continues to demand heat, voltage for triggering of SCR Q1 continues to be supplied via lead L2 by means of thermostat switch 15SW. Thus, following such a protective deenergization, SCR Q1 may once more be retriggered when thermistor TH2 has cooled sufficiently. Upon retriggering of SCR Q1 and resultant closing of contacts K1, power is once more supplied by means of lead 17 to ignition circuit 19 and gas valve circuit 21. While thermistor TH2 is cooling, thermistor TH4 will also cool so that when power is once more supplied to gas valve circuit 21, thermistor TH4 will have reverted to its first stable state, i.e., a state in which it is unheated and thus insufficient current will be supplied to gas valve winding 13W for energization thereof. Reenergization of ignition circuit 19 causes recurrent sparking across electrode 23 and reheating of thermistor H4 resulting from current drawn therethrough by triggering of SCR Q2 will once more momentarily heat thermistor TH4 above a predetermined threshold temperature at which it will shift to its stable self-heating second state, thus reenergizing gas valve winding 13W. Reset of the apparatus is thus automatic. Triggering of SCR Q1 is also protectively terminated or prevented should thermistors TH1 or TH3 become heated as a result of a high plenum temperature or an insufficient forced air draft. If this occurs, reset is again automatic.

It will be observed that resistor R2 is shunted by contacts K2 as long as contactor winding KW is energized to close these contacts but is, in effect, switched into the triggering circuit for SCR Q1 whenever contacts K2 are opened. This has the effect of causing the reset interval, during which the one of thermistors TH1—TH3 which cause termination of triggering of SCR Q1 cools to the reset temperature at which it permits retriggering thereof, to be substantially greater than its heating interval. This greater recycling time interval desirably allows purging of any accumulated gas between ignition attempts.

FIG. 2 illustrates another embodiment of apparatus of this invention wherein an SCR Q3 has its anode-cathode terminals series connected with gas valve 13W between leads 17 and L3. Also connected across leads 17 and L3 are a first series circuit including a thermistor TH5 and a resistor R5 and a second series circuit including a resistor R6 and a thermistor TH6, the latter resistor and thermistor constituting a voltage divider. Thermistor H4, as in the circuit of FIG. 1, is connected across leads 27 and 29. The junction of resistor R6 at thermistor TH6 is connected to the gate of triggering terminal of SCR Q3 by means of diode D4. Another diode D5 is connected across gas valve winding 13W. It should be pointed out that while this is relatively more complex than the FIG. 1 circuit, the thermistors of this second embodiment need only carry relatively small current, with SCR Q3 controlling the higher current required to sufficiently energize winding 13W. The use of a thermistor in series with this winding, as in FIG. 1, requires that the thermistor be capable of dissipating considerable power. Such a thermistor may not be practical where, because of size or rating, winding 13W requires a rather large current for energization. Hence the FIG. 2 circuit may be desirable.

The three thermistors H4, TH5 and TH6 are illustrated as being thermally coupled. Consequently, heating of thermistor H4 causes heating of thermistor TH5 and heating of this thermistor in turn causes heating of thermistor TH6. Thermistor TH5 is a PTC thermistor having a transition temperature above which the resistance thereof increases relatively abruptly. Thermistor TH6 is also a PTC type and preferably also has a transition temperature above which its resistance increases relatively abruptly (although it need not have this "sharp break" characteristic). This type of thermistor has a voltage/current characteristic having a negative resistance region. Accordingly, for a proper value of resistor R5, thermistor TH5 is bistable in operation and will thus operate in either an unheated first state or in a self-heating second state, its operating point being shifted from the first to the second state by momentary heating supplied by thermistor H4, as in the manner of the apparatus of FIG. 1. When ignition circuit 19 draws current through thermistor H4 (signalling, in effect, a demand for fuel) as a result of triggering of SCR Q2, this thermistor causes momentary heating of thermistor TH5 which causes the latter to shift from its first state to its second state. In its self-heating second state, the resultant increase of temperature of thermistor TH5 causes heating of thermistor TH6. When the latter reaches a predetermined threshold temperature, the voltage at the junction of thermistor TH6 and resistor R6 is increased sufficiently with respect to lead L3 to cause triggering of SCR Q3, causing energization of gas valve winding 13W and thus causing gas to be supplied to burner 11. Upon ignition of the gas, ignition circuit 19 ceases to draw current through thermistor H4 which therefore cools. However, as long as the supply voltage remains across leads 17 and L3, thermistor TH5 remains in its stable self-heating state and consequently continues to supply heat to thermistor TH6 whose increased resistance causes continued triggering of SCR Q3. The shift in operation of thermistor TH5 from its first to its second stable state thus causes triggering current to be supplied to SCR Q3. Until heated by thermistor TH5, thermistor TH6 shunts triggering current away from the gate terminal of SCR Q3. Accordingly, until heated above its threshold temperature at which it will permit sufficient triggering current to be supplied to the SCR for causing triggering thereof, thermistor TH6 provides a low resistance path from the gate terminal of the SCR to ground which effectively precludes any triggering thereof due to transients. Other types of triggerable semiconductor current switching devices, e.g., a triac, may be employed in place of SCR Q3.

FIG. 3 illustrates a control utilizing the gas valve arrangement of FIG. 1 with thermistor TH4 being series connected with gas valve winding 13W. However, thermistor TH4 is thermally coupled to thermistor H2 and TH2 thus eliminating the requirement of a separate heater thermistor for thermistor TH4. Such an arrangement provides increased simplicity and further economy.

Rather than employing the SCR and magnetic contactor arrangement of FIG. 1, this control employs instead a triac Q4 having its main terminals connected for supplying power from lead L1 (upon closing of thermostat switch 15SW) to the ignition circuit 19 and gas valve circuit 21. A capacitor C4 is connected between leads L1 and L3 for transient filtering, these leads being connected across a suitable AC source, e.g. 115 v. AC line voltage, as in the previous embodiments. A triggering circuit like that shown for SCR Q1 in the control of FIG. 1 is provided for triac Q4 and includes a diode D5 and the three thermistors TH1—TH3. A capacitor C5 and resistor R7 are series connected between the anode and diode D5 and lead L3. The triggering circuit for SCR Q2 includes a diode D6 and resistor R8 connected from one of the main terminals of triac Q4 and one side of capacitor C3 for supplying triggering current thereto. A current limiting resistor R9 is located in series with neon bulb NE1. A resistor R10 interconnects the gate terminal of SCR Q2 and lead L3.

The circuit of FIG. 3 operates in substantially the same manner as the circuit of FIG. 1. Upon a demand for heat by a thermostat 15, thermostat switch 15SW closes and triggering current is supplied through diode D5 to cause triggering of triac Q4. This supplies voltage for energization of ignition circuit 19 and gas valve circuit 21. Triggering of SCR Q2 draws current through thermistor H2 and self-heating thereof supplies momentary heating for thermistor TH4 which, as in the manner previously described, shifts from its unheated first state wherein it supplies insufficient current to open gas valve 13 to its self-heating second state wherein current is supplied to gas valve winding 13W for supplying gas to burner 11. Gas is supplied thereto as long as thermostat 15 continues to demand heat. Triggering of triac Q4 is terminated by thermistor TH2 if ignition is not successful since thermistor H2 continues to heat thermistor TH2 if triggering of SCR Q2 continues for a predetermined time interval.

In view of the above, it will be seen that the several objects of the invention are achieved and other advantageous results attained.

As various changes could be made in the above constructions without departing from the scope of the invention, it is intended that all matter contained in the above description or shown in the accompanying drawings, shall be interpreted as illustrative and not in a limiting sense.

What I claim is:

1. In apparatus for controlling the operation of a furnace including a burner and an electrically energizable fuel valve which, when sufficiently energized, supplies fuel to the burner, said apparatus including means for producing a signal indicating a demand for fuel, means for energizing the fuel valve comprising:

a thermistor having a negative thermal coefficient of resistivity and an equilibrium current/voltage characteristic having a negative resistance region connected serially with the fuel valve, said fuel valve having a a resistance for bistable operation in either of two states comprising an unheated first state and a self-heating second state, said thermistor-shifting operation from said first to said second state when momentarily heated above a predetermined threshold temperature, said thermistor in said second state being adapted to cause energization of the fuel valve for supplying fuel to the burner;

means, energized by the fuel demand signal, for momentarily heating said thermistor above said threshold temperature, whereby the fuel valve is energized for supplying fuel to the burner in response to a demand for fuel.

2. In apparatus as set forth in claim 1, said means for heating said thermistor comprising a second thermistor thermally coupled to the first said thermistor and having a positive temperature coefficient.

3. In apparatus as set forth in claim 2, said second thermistor having a transition temperature above which the resistance thereof increases relatively abruptly.

4. Apparatus as set forth in claim 1 including fuel ignition means energizable in response to the demand of a thermostat and deenergizable in response to ignition of the fuel, said means for heating said thermistor including a second thermistor, interconnected with the fuel ignition means, for heating the first-mentioned thermistor above said threshold temperature when said fuel ignition means is energized, whereby the fuel valve is energized in response to the demand of the thermostat for heat.

5. In apparatus as set forth in claim 4, said second thermistor having a positive temperature coefficient and a transition temperature above which the resistance thereof increases relatively abruptly.

6. In apparatus for controlling the operation of a furnace including a burner and an electrically energizable fuel valve which, when sufficiently energized, supplies fuel to the burner, said apparatus including means for producing a signal indicating a demand for fuel, means for energizing the fuel valve comprising:

a thermistor connected in a circuit including a resistance for bistable operation in either of two states comprising an unheated first state and a self-heating second state, said thermistor-shifting operation from said first to said second state when momentarily heated above a predetermined threshold temperature, said thermistor in said second state being adapted to cause energization of the fuel valve for supplying fuel to the burner, a triggerable semiconductor current-switching device including main terminals interconnected with the fuel valve for energization thereof when said device is triggered, said device further including a triggering terminal, said thermistor causing triggering current to be supplied thereto for triggering of said device when said thermistor is in said second state;

a further thermistor thermally coupled to the first said thermistor for being heated thereby when the first said thermistor is in said second state, said further thermistor being interconnected with said triggering terminal for causing triggering current to be supplied thereto when said further thermistor is heated above a predetermined threshold temperature by the first said thermistor; and means, energized by the fuel demand signal, for momentarily heating said thermistor above said threshold temperature, whereby the fuel valve is energized for supplying fuel to the burner in response to a demand for fuel.

7. In apparatus as set forth in claim 6, said further thermistor having a positive temperature coefficient and being adapted to shunt-triggering current away from said triggering terminal until heated above said threshold temperature.

8. In apparatus as set forth in claim 7, said further thermistor having a transition temperature above which the resistance thereof increases relatively abruptly.

9. In apparatus for controlling a furnace including a burner and an electrically energizable fuel valve which, when sufficiently energized, supplies fuel to the burner, said apparatus including fuel ignition means energizable in response to the demand of a thermostat and deenergizable in response to ignition of the fuel, means for energizing the fuel valve comprising:

a first thermistor having an equilibrium current/voltage characteristic having a negative resistance region and connected for bistable operation in either of two states comprising an unheated first state and a self-heating second state, said thermistor shifting operation from said first to said second state when momentarily heated above a predetermined threshold temperature, said thermistor in said second state having a resistance causing energization of the fuel valve for supplying fuel to the burner;

a second thermistor, interconnected with the fuel ignition means, for heating said first thermistor above said threshold temperature when said fuel ignition means is energized, whereby the fuel valve is energized in response to the demand of the thermostat for heat.

10. In apparatus as set forth in claim 9, said second thermistor having a positive temperature coefficient and a transition temperature above which the resistance thereof increases relatively abruptly.